(12) United States Patent
Ou

(10) Patent No.: US 6,561,430 B2
(45) Date of Patent: May 13, 2003

(54) IC CARD WITH DISPLAY SCREEN

(76) Inventor: Chi-Yuan Ou, PO Box 82-144, Taipei (TW)

( * ) Notice: Subject to any disclaimer, the term of this patent is extended or adjusted under 35 U.S.C. 154(b) by 174 days.

(21) Appl. No.: 09/756,919

(22) Filed: Jan. 10, 2001

(65) Prior Publication Data

US 2002/0088863 A1 Jul. 11, 2002

(51) Int. Cl.[7] .......................... G06K 19/06; G06K 19/00
(52) U.S. Cl. ........................................ 235/487; 235/492
(58) Field of Search .................................. 235/380, 379, 235/441, 432, 486, 382, 382.5, 436, 487; 380/23, 24, 25, 216; 709/200, 217; 705/41

(56) References Cited

U.S. PATENT DOCUMENTS

| | | | | |
|---|---|---|---|---|
| 4,692,601 A | * | 9/1987 | Nakano | 235/380 |
| 4,742,351 A | * | 5/1988 | Suzuki | 235/380 |
| 4,749,982 A | * | 6/1988 | Rikuna et al. | 235/380 |
| 4,797,542 A | * | 1/1989 | Hara | 235/380 |
| 4,801,787 A | * | 1/1989 | Suzuki | 235/380 |
| 4,806,745 A | * | 2/1989 | Oogita | 235/492 |
| 4,812,634 A | * | 3/1989 | Ohta et al. | 235/487 |
| 4,868,376 A | * | 9/1989 | Lessin et al. | 235/380 |
| 4,916,296 A | * | 4/1990 | Streck | 235/454 |
| 4,918,631 A | * | 4/1990 | Hara et al. | 235/380 |
| 5,034,597 A | * | 7/1991 | Atsumi et al. | 235/375 |
| 5,146,068 A | * | 9/1992 | Ugawa et al. | 235/379 |
| 5,539,819 A | * | 7/1996 | Sonoyama et al. | 379/354 |
| 5,559,313 A | * | 9/1996 | Claus et al. | 235/380 |
| 5,627,355 A | * | 5/1997 | Rahman et al. | 235/375 |
| 5,857,079 A | * | 1/1999 | Claus et al. | 235/380 |
| 6,438,575 B1 | * | 8/2002 | Khan et al. | 709/200 |
| 2002/0088863 A1 | * | 7/2002 | Ou | 235/487 |

FOREIGN PATENT DOCUMENTS

JP          363273982 A    * 11/1998

* cited by examiner

*Primary Examiner*—Thien M. Le
(74) *Attorney, Agent, or Firm*—Leong C. Lei

(57) ABSTRACT

An IC card includes a card reader interface for receiving data from a card reader, a microprocessor for decoding, decrypting and categorizing the data or converting the data into displaying format, an electrically erasable programmable read only memory for storing the data, a display screen, a display driver for driving the display screen, and a solar battery for providing power, whereby it is unnecessary for a user to look for a card read in order to read the data stored in the IC card.

1 Claim, 2 Drawing Sheets

IC CARD WITH DISPLAY SCREEN

BACKGROUND OF THE INVENTION

1. Field of the Invention

This invention is related to an IC card and in particular to one with a display screen for enabling a user to read the data stored in the IC card without using a card reader.

2. Description of the Prior Art

With the progress in science, many kinds of transaction are gradually achieved by IC cards, such as credit cards, ATM cards, phone cards, fare cards, . . . etc. The conventional IC card generally falls into the following two categories:

1. The first one is possessed of control functions and includes an 8-bit, 16-bit or 32-bit microprocessor with data encryption standard (DES) and RSA, which is generally called the Smart Card.
2. The second one includes a memory and a simple logic circuit wherein the memory may be a read only memory or an electrically erasable programmable read only memory with 4K, 8K, 16K or 1M bytes, which is generally called the Memory Card.

In addition, the above-mentioned IC cards are generally provided with a magnetic strip, magnetic codes, memory and the like for increasing the application range.

However, when a user would like to know the data stored in any one of the above-mentioned IC cards, he or she must look for a card reader in order to read the contents stored in the IC cards thereby causing much inconvenience in use. Moreover, IC cards of different purposes cannot be combined together and so the user must always bring a number of IC cards of different purposes with her or him thus causing further inconvenience in use.

Therefore, it is an object of the present invention to provide an improvement in the structure of an IC card which can obviate and mitigate the above-mentioned drawbacks.

SUMMARY OF THE INVENTION

This invention is related to an improvement in the structure of an IC card.

It is the primary object of the present invention to provide an IC card which enables a user to read the data stored in the IC card without using a card reader.

It is another object of the present invention to provide an IC card which includes a card reader interface for receiving data from a card reader, a microprocessor for decoding, decrypting and categorizing the data or converting the data into displaying format, an electrically erasable programmable read only memory for storing the data, a display screen, a display driver for driving the display screen, and a solar battery for providing power, whereby it is unnecessary for a user to look for a card read in order to read the data stored in the IC card.

It is still another object of the present invention to provide an IC card which utilizes a microprocessor, an electrically erasable programmable read only memory and contact switches to achieve the purpose of saving different kinds of data thereby making it unnecessary for a user to bring a number of IC cards with her or him.

It is a further object of the present invention to provide an IC card which utilizes a solar battery to charge a secondary cell so that in case of insufficient light, the secondary cell may provide required power for the operation of the IC card.

The foregoing objects and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts. Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PRESENT INVENTION

Figure 1:
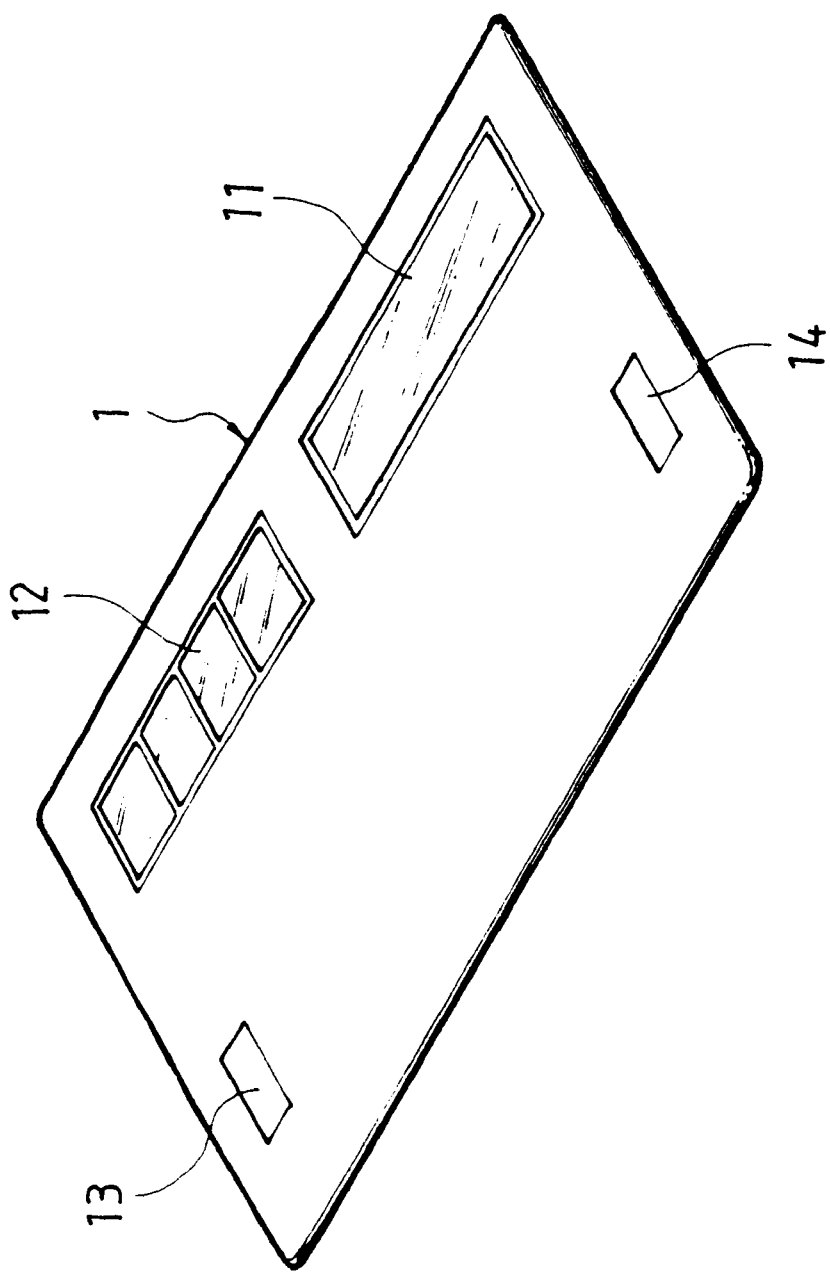
FIG. 1 is a perspective view of the present invention.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

With reference to the drawings and in particular to FIG. 1 thereof, the present invention comprises an IC card body 1 on which are mounted a display screen 11, a solar battery 12 and two contact switches 13 and 14. The contact switches 13 and 14 are used for actuating the internal circuit (see FIG. 2) of the IC card body 1 so as to select the desired display function to show the data stored in the IC card on the display screen 11.

The solar batteries 12 are used for providing power to the internal circuit of the IC card 1 and charging a secondary cell 25 within the circuit, so that in case of insufficient light, the secondary cell will be able to provide the required power for the operation of the IC card.

Figure 2:
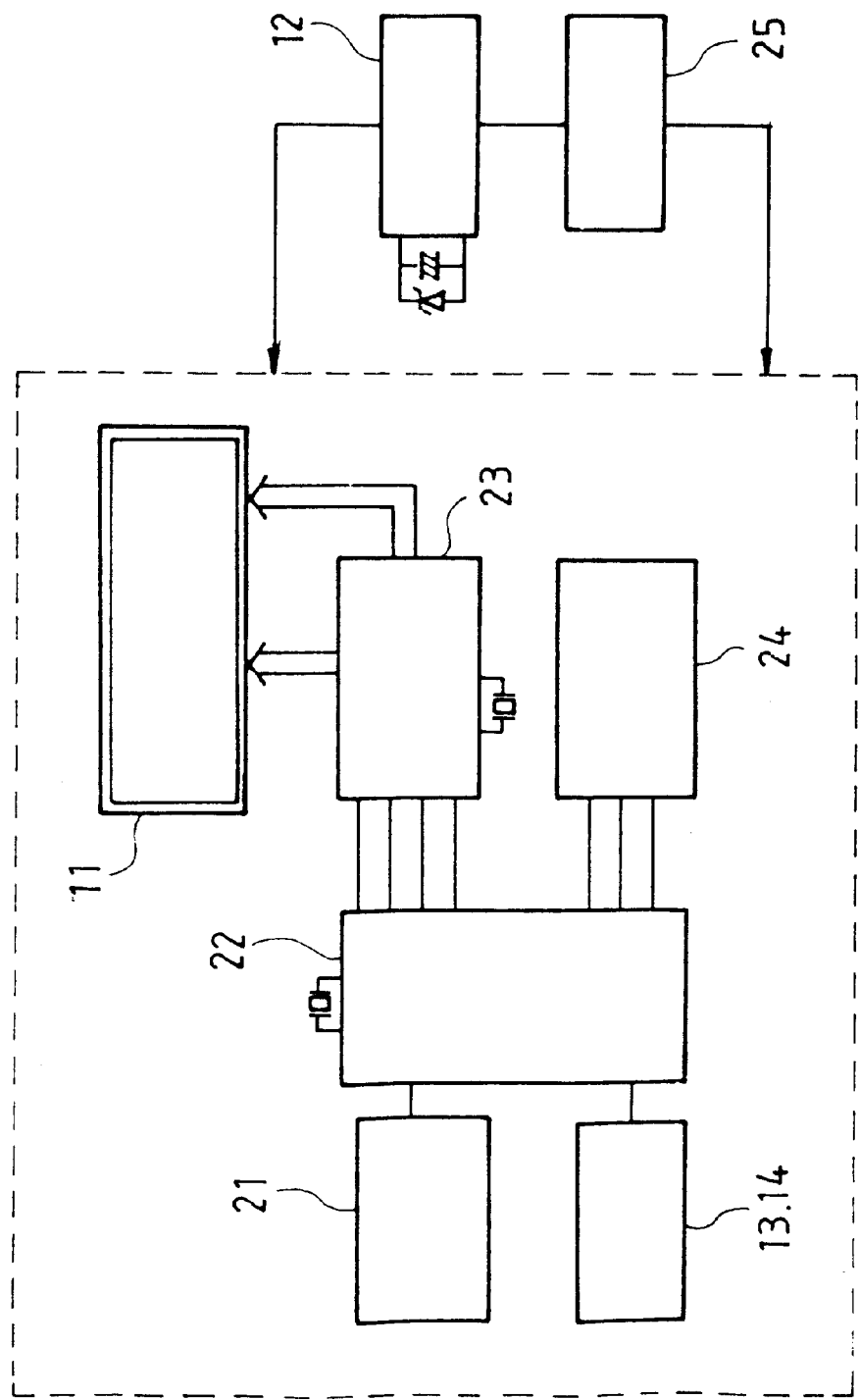
FIG. 2 is a block diagram of the present invention.

Referring to FIG. 2, the internal circuit of the IC card body 1 generally comprises a card reader interface 21, a microprocessor 22, a display driver 23, an electrically erasable programmable read only memory 24, and a secondary cell 25, wherein the card reader interface 21 is used for receiving data from a card reader (not shown) and transmitting the data to the microprocessor 22 for decoding, decrypting and categorizing and then storing the data in electrically erasable programmable read only memory 24.

When a user touches the contact switches 13 and 14, the microprocessor 22 will read the data stored in the electrically erasable programmable read only memory 24 (which is provided with a character producing program), convert the data into English or Chinese characters, and transmit the data to the display driver 23 to cause the display screen 11 to show the data.

Furthermore, the contact switches 13 and 14 can be operated as follows:

1. Touch and hold the contact switch 13 and then touch the contact switch 14 once to turn on the power.
2. After the power is turned on, touch and hold the contact switch 13 and then touch the contact switch 14 to display data stored in the electrically erasable programmable read only memory 24. When the contact switch 13 is kept touching, each time of touching the contact switch 14 will display different data stored in the electrically erasable programmable read only memory 24.

3. Touch the contact switches 13 and 14 simultaneously for a certain period of time to turn off the power thereby achieving the purpose of saving power when not in use. However, it should be noted that the card reader is not arranged in the present invention and the present invention only utilizes a card reader interface to read data and then store the data in the microprocessor so that it is unnecessary to spend any time to look for a card reader thereby providing much convenience in use.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. An IC card with a display screen comprising:
    a card reader interface for receiving data from a card reader;
    a microprocessor for decoding, decrypting and categorizing said data or converting said data into displaying format;
    an electrically erasable programmable read only memory for storing said data;
    a display screen;
    a display driver for driving said display screen; and
    a solar battery for providing power,
    wherein said data stored in said electrically erasable programmable read only memory is selected by contact switches, said solar battery is connected with a secondary cell, said electrically erasable programmable read only memory has a character producing program for converting said data into English or Chinese characters for showing in said display screen.

* * * * *